US009329457B2

(12) United States Patent
Martin

(10) Patent No.: US 9,329,457 B2
(45) Date of Patent: May 3, 2016

(54) METHOD AND SYSTEM FOR DETECTING AND CLEARING CAMERA BUBBLE MISTING

(75) Inventor: Walter A. Martin, Ballymena (GB)

(73) Assignee: Sensormatic Electronics, LLC, Boca Raton, FL (US)

( * ) Notice: Subject to any disclaimer, the term of this patent is extended or adjusted under 35 U.S.C. 154(b) by 715 days.

(21) Appl. No.: 13/591,290

(22) Filed: Aug. 22, 2012

(65) Prior Publication Data

US 2014/0055608 A1  Feb. 27, 2014

(51) Int. Cl.
G03B 17/55 (2006.01)
H04N 5/243 (2006.01)
H04N 5/225 (2006.01)
G08B 13/196 (2006.01)
G08B 29/18 (2006.01)
G03B 17/08 (2006.01)
G03B 37/02 (2006.01)

(52) U.S. Cl.
CPC .......... G03B 17/55 (2013.01); G08B 13/19606 (2013.01); G08B 29/18 (2013.01); H04N 5/2252 (2013.01); G03B 17/08 (2013.01); G03B 37/02 (2013.01)

(58) Field of Classification Search
CPC ......... H04N 7/181; H04N 5/243; G03B 17/55
See application file for complete search history.

(56) References Cited

U.S. PATENT DOCUMENTS

2005/0094994 A1  5/2005  Paolantonio et al.
2012/0319468 A1*  12/2012  Schneider .............. H04N 7/185
                                                         307/1

FOREIGN PATENT DOCUMENTS

| JP | 0738788 | 2/1995 | |
| JP | 07131688 | 5/1995 | |
| JP | H07131688 A * | 5/1995 | ............. H04N 5/225 |
| JP | 2009135723 | 6/2009 | |
| JP | 2009135723 A * | 6/2009 | ............. H04N 5/225 |

OTHER PUBLICATIONS

International Search Report and Written Opinion of the International Searching Authority mailed Dec. 13, 2013, from counterpart International Application No. PCT/US2013/056080.
International Preliminary Report on Patentability, mailed Mar. 6, 2015, from counterpart International Application No. PCT/US2013/056080, filed on Aug. 22, 2013.

* cited by examiner

Primary Examiner — Jefferey Harold
Assistant Examiner — Justin Sanders
(74) Attorney, Agent, or Firm — HoustonHogle, LLP

(57) ABSTRACT

A security camera system detects misting within the transparent portion of the security camera system by analyzing the actual images that are captured by the security camera system in order to determine whether or not there is misting on the transparent portion. Specifically, video analytics are applied to detect areas of the scene that appear to be out of focus as a result of misting of the transparent portion of the security camera system, also known as the bubble. The system uses, in a preferred embodiment, an edge-detection algorithm to look for areas of the scene that appear to have gone out of focus. When these are detected, the condensation mitigation system is activated in order to remove any misting.

18 Claims, 3 Drawing Sheets

METHOD AND SYSTEM FOR DETECTING AND CLEARING CAMERA BUBBLE MISTING

BACKGROUND OF THE INVENTION

Security camera systems are typically enclosed within protective outer housings. Most housings include a base portion and a transparent portion that is sometimes colloquially referred to as the camera bubble. The base portion encloses and protects the electronics and is typically used for mounting the security camera system. The transparent portion protects the optical elements of the security camera system while allowing the camera to capture images of the surrounding environment.

Often, the security camera systems are installed in uncontrolled environments that subject the security camera systems to large swings in temperature and large changes in ambient moisture. For example, a security camera system located to monitor a parking lot is exposed to freezing temperatures in the winter and high temperatures in the summer, in addition to rain and snow.

Moisture exposure combined with swings in ambient temperature can cause the internal or external surfaces of the transparent portion of the security camera system to sometimes exhibit misting in which water condenses on the internal or external surfaces of this transparent portion. This misting degrades the images captured by the camera by causing those images to be cloudy and blurred.

To address the misting problem, security camera systems will often have a condensation mitigation system. These systems typically take the form of heaters and ventilation systems that heat air within the security camera housings and flush air through the transparent portions in order to remove any misting, especially on the internal surfaces of the transparent portions of the security camera systems.

A couple of different approaches are used to control the operation of the condensation mitigation systems. One solution is to only monitor the temperature within the security camera system and then activate the condensation mitigation system when the temperature is such that the transparent portion could mist. An alternative approach is to install a humidity sensor within the camera housing to detect the humidity within the transparent portion of the housing. When the humidity reaches a threshold level, the condensation mitigation system is activated to prevent any misting of the transparent portion.

SUMMARY OF THE INVENTION

The current solutions for preventing the misting of the transparent portion of the housing have a number of problems.

When the condensation mitigation system is operated solely based on the temperature within the camera housing, the system is often operated when no misting is in fact present. Since the heaters and/or ventilation systems of the typical condensation mitigation systems consume electrical power, this solution is somewhat costly in terms of the power consumption of the security camera systems over the long term.

Using humidity sensors to control the activation of the condensation mitigation systems similarly has a number of drawbacks. First, humidity sensors are a somewhat expensive component. Thus, using them in the security camera systems increases the overall manufacturing costs. Secondly, it is often difficult to obtain accurate humidity readings from these sensors and, to be accurate, the sensors should be installed near the transparent portion where the humidity reading is relevant to whether or not the transparent portion is at risk of misting. This requirement creates manufacturing and design challenges.

The present invention takes a different approach to detecting misting within the transparent portion of the security camera system. It uses and analyzes the actual frames that are captured by the security camera system in order to determine whether mist is forming on the transparent portion. Specifically, video analytics are applied to detect areas of the images of the frames that appear to be out of focus as a result of misting of the transparent portion of the security camera system, also known as the bubble. The system uses, in a preferred embodiment, an edge-detection algorithm to look for areas of the scene that appear to have gone out of focus. When these are detected, the condensation mitigation system is activated in order to remove any misting on the transparent portion.

In general, according to one aspect, the invention features a security camera system comprising a camera housing including a transparent portion and a camera located within the transparent portion for generating images of a scene through the transparent portion. A condensation mitigation system is used for removing condensation on the transparent portion of the security camera housing. A controller analyzes the images of the scene for indications of misting on the transparent portion of the security camera housing and activates the condensation mitigation system in response to detecting indications of misting.

Typically, the camera housing further includes a base portion for mounting the security camera system and pan and tilt mechanism for directing the camera.

The condensation mitigation system comprises a heater for heating air within the transparent portion of the camera housing along with a fan or fans for moving air through the transparent portion of the camera housing.

In the preferred embodiment, the controller analyzes the images for indications of misting by analyzing edges within the image for edge sharpness and then determines whether there is degradation in the edge sharpness. When this is detected, the controller activates the condensation mitigation system.

The controller then preferably continues to analyze the images for changes in edge sharpness after the activation of the condensation mitigation system to determine whether the condensation has been remediated. In one example, the controller deactivates the condensation mitigation system when edge sharpness within the images has been reestablished.

In the preferred embodiment, controller deactivates the condensation mitigation system after a predetermined time even if edge sharpness has not been reestablished.

In general, according to another aspect, the invention features a method of operation of a security camera system that comprises a camera housing including a transparent portion, a camera located within the transparent portion for generating images of a scene through the transparent portion, and a condensation mitigation system for removing condensation on the transparent portion of the security camera housing. The method comprises analyzing the images of the scene for indications of misting on the transparent portion of the security camera housing and activating the condensation mitigation system in response to detecting the indications of misting.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
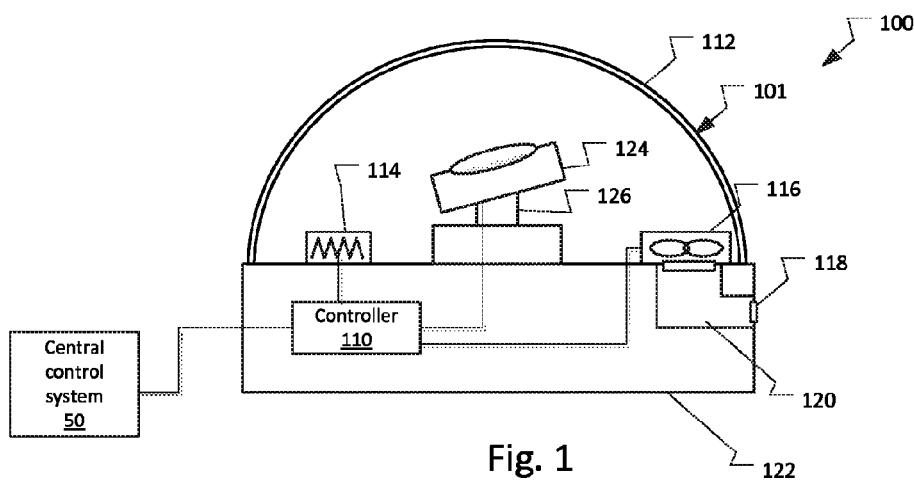
FIG. 1 is a schematic cross-sectional view of a security camera system to which the present invention is applicable.

FIG. 1 is a schematic diagram of a security camera system 100 to which the present invention is applicable.

The security camera system 100 generally comprises a housing 101 and a camera 124.

The housing 101 of the security camera system 100 comprises a base portion 122. Often, this base portion contains most of the electronics of the security camera system 100 and serves as a mounting system for the security camera system 100 such that it can be mounted in the ceiling of an office building or on a pole in a parking lot of an office building, to list two common examples.

The housing 101 further comprises a transparent portion 112, also known as a camera bubble, that extends over the top of the base portion 122. This transparent portion 112 allows the camera 124, mounted on the base portion 122, to view a surrounding scene through the transparent portion 112.

In the illustrated embodiment, the camera 124 is mounted on a pan and tilt mechanism 126 that allows the camera to capture images from different portions of the scene through the transparent portion 112. In other embodiments, the camera 124 has no pan tilt mechanism but instead has a wide angle lens, for example, to thereby capture a large portion of the surrounding scene.

The frames that are generated by the camera 124 are transmitted to a controller 110. In the current embodiment, the controller 110 then transfers those frames to a central control system 50 either over a wireless or wired network. Typically the central control system 50 allows for the storage of the images and concurrent or later access by security personnel or building management.

The controller 110 also operates a condensation mitigation system that is located within the transparent portion 112 of the camera housing 101. In the illustrated embodiment, the condensation mitigation system includes a heater 114 that heats the air contained within the housing 101 and specifically within the transparent portion 112. Also preferably, the condensation mitigation system further comprises at least one fan 116 that circulates air through the transparent portion 112. This fan draws air into or out of the housing via a duct 120 that is in communication with the external environment through a port 118.

Figure 2:
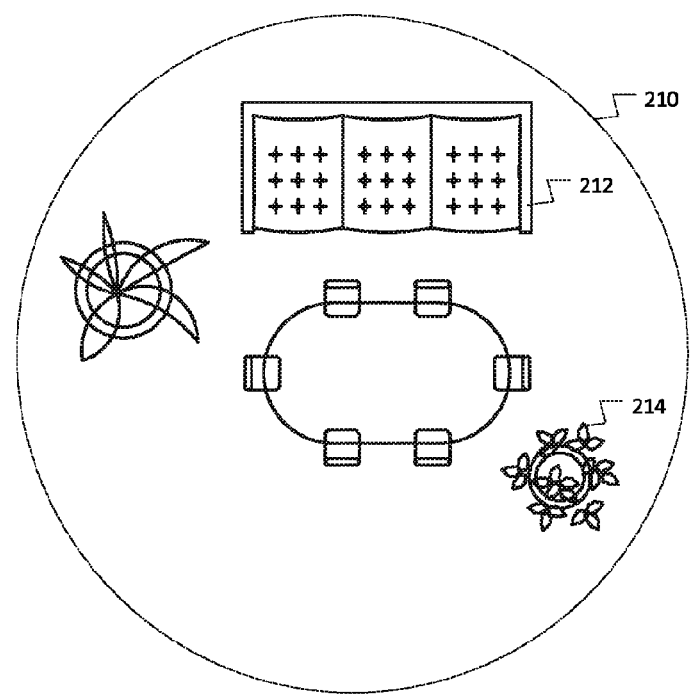
FIG. 2 illustrates an exemplary image of a scene captured by the camera of the security camera system.

FIG. 2 illustrates an image 210 of a scene captured by the camera 124. An edge detection algorithm in the controller 110 controls the focus of the camera 124, unless a fixed focus camera is used. In the current embodiment, the camera focus mechanism is controlled using the edge detection algorithm that moves the focus in order to obtain the sharpest edges within the image 210. In another embodiment focus may be controlled independently of the edge detection algorithm being used for mist detection.

Figure 3:
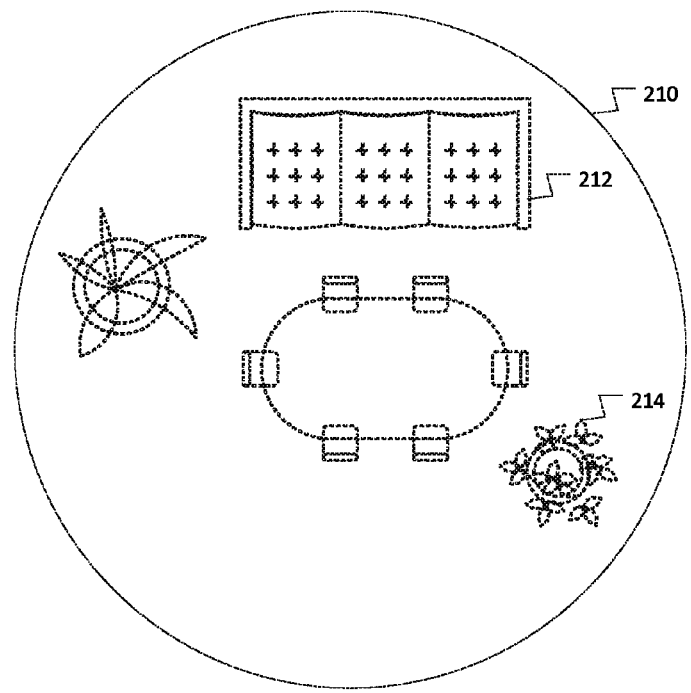
FIG. 3 illustrates an exemplary image of the scene captured by the camera of the security camera system that exhibits global misting of the transparent portion of the security camera system.

FIG. 3 illustrates the image 210 of the scene captured by the camera 124 when there is global misting of the transparent portion 112 of the housing. Specifically, the edge sharpness of the elements such as the couch 212 or plant 214 degrade. This degradation of the edge sharpness of these elements within the image 210 will not be correctable by the controller 110 changing the focus of the camera 124.

Figure 4:
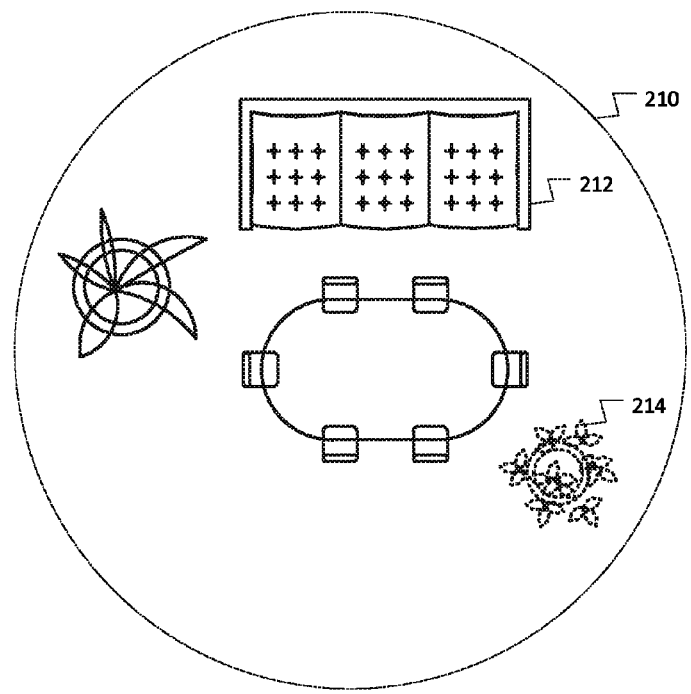
FIG. 4 illustrates an exemplary image of the scene captured by the camera of the security camera system that exhibits selective misting of the transparent portion of the security camera system.

FIG. 4 illustrates an alternative scenario in which only portions of the transparent portion 112 of the housing 101 are subject to misting. Here, only one or a few elements, specifically plant 214, experience a loss of edge sharpness in the image 210 due to localized misting on the transparent portion 112. Again, this degradation of image sharpness will not be correctable by the controller 110 by changing the focus of the camera 124. In practice, regions of misting will grow and contract as the humidity and temperature within the transparent portion change.

Figure 5:
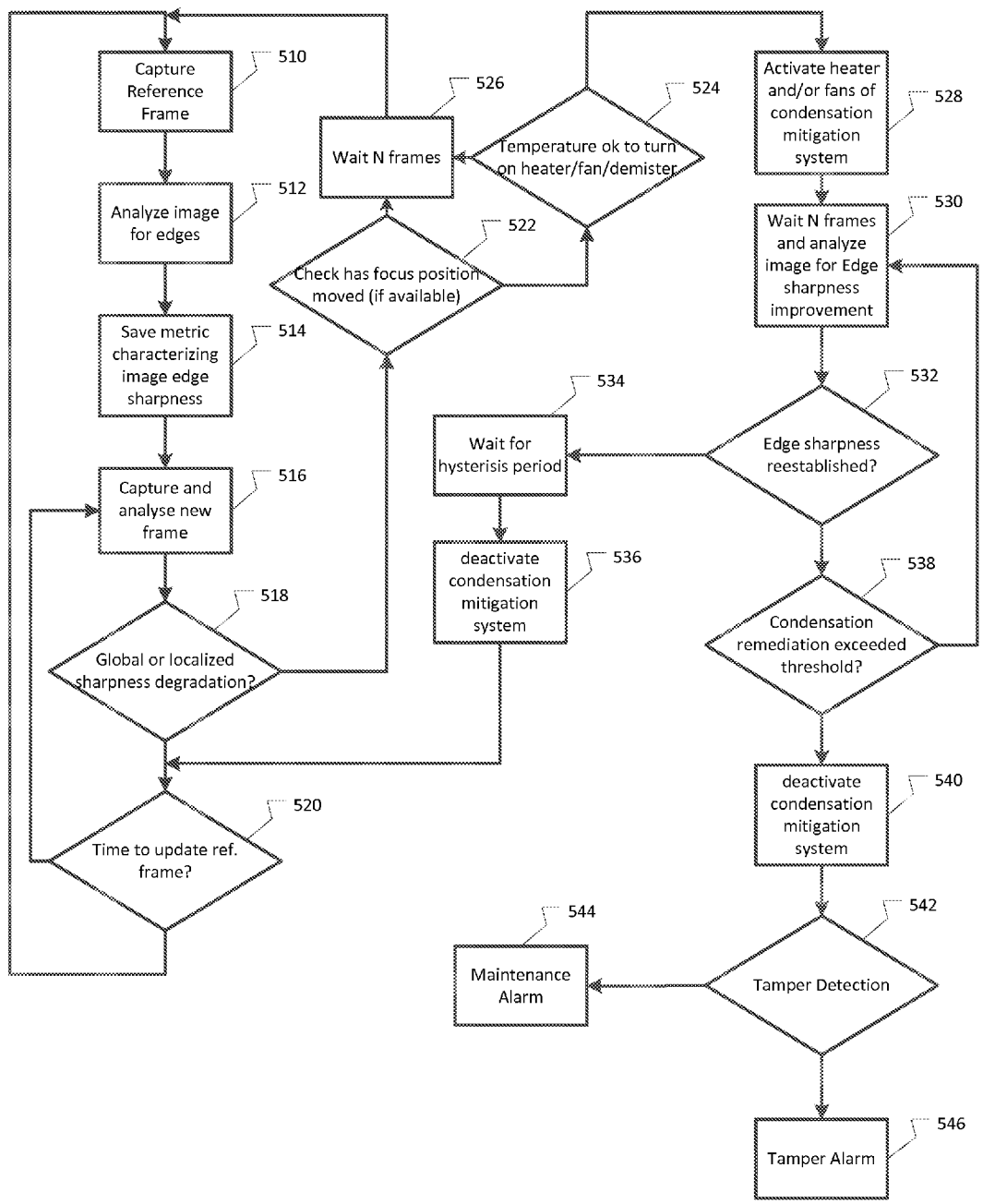
FIG. 5 is a flow diagram illustrating the operation of the security camera system according to the preferred embodiment of the present invention.

FIG. 5 illustrates the operation of the controller 110 and the condensation mitigation system in order to detect and remediate misting of the transparent portion 112 of the security camera 100.

In more detail, the camera 124 captures a reference frame (frame A) of the scene in step 510. The image of this reference frame is saved by the controller 110. The controller 110 in step 512 analyzes the image of the frame for edges. This analysis is used to control the autofocus of the camera 124 to maximize the edge sharpness in the image according to the autofocus algorithm, as is common, in one embodiment. The algorithm will typically be disabled for a period of time following a switch of the camera IR cut filter as the sudden change in brightness could erroneously trigger the algorithm.

Nevertheless, in step 514, the controller calculates and then saves a metric characterizing the edge sharpness of elements within the captured image as part of a video analysis. In another embodiment, the controller calculates and saves a metric associated with the contrast of the image.

Next, subsequent frames are then captured by the camera 124 and the images analyzed by the controller 110 in step 516. The controller analyzes the images for global or localized sharpness or contrast degradation in step 518 by calculating the edge sharpness or contrast metric for the images of the new frames. The controller then compares that newly calculated metric to that calculated for the reference frame and stored in the controller. The goal of the algorithm is to capture the point where misting starts to occur.

If no sharpness or contrast degradation is detected in step 518, then in step 520, the controller 110 determines whether it is time to update the reference frame for condensation analysis. If it is not yet time to update the reference frame then flow returns to step 516 and the next frames are captured and their images analyzed by the controller 110. Otherwise, a new reference frame A is captured in step 510.

Returning to step 518, if localized or global degradation in the sharpness of the image is detected, this is interpreted by the controller as indications of misting. Then the controller 110 determines whether or not the focus position of the camera 124 has moved in step 522. If the focus position has moved, then the degradation in edge sharpness can simply be due to the change in focus. As result, the controller 110 then waits a number of frames in step 526 and then captures a new reference frame in step 510 for the new focus position.

However, if the focus position has not changed in 522, then the controller 110 determines whether or not the ambient temperature is acceptable for the activation of the condensation mitigation system in step 524. Generally, if the temperature is either too high or too low, then the condensation mitigation system is not activated because it could result in damage to the camera system 100.

If the temperature is incompatible with the activation of the condensation mitigation system, then the controller 110 again waits for a number of new frames to be captured by the camera 124 in step 526 and then captures a new reference image A in step 510.

On the other hand, if the temperature is appropriate for the activation of the condensation mitigation system as determined in step 524, then the heater and/or fans and/or other elements of the condensation mitigation system are activated in step 528.

In step 530, a number of frames are captured by the camera 124. The controller analyzes these captured images for an improvement in the edge sharpness within the images in step 530 by calculating the edge sharpness metric for these new frames. If it is determined that edge sharpness has been reestablished in step 532, then the controller waits for a predetermined time, in step 534 and then deactivates the condensation mitigation system in step 536.

On the other hand, if it is determined that acceptable edge sharpness has not yet been reestablished, in step 532, then the controller 110 determines whether or not the condensation mitigation system has been activated for too long. Generally, if misting is not removed after a predetermined time, then it could be the result of some improper operation within the camera system 100 or simply rain drops on the transparent portion 112. There is also a risk of damage such as overheating of the condensation mitigation system.

As result, if this threshold is not exceeded in step 538, then the controller 110 continues to analyze subsequent frames for improvements in edge sharpness.

However, if the condensation remediation system has been activated for too long, then the condensation mitigation system is deactivated in step 540. It determines whether or not it is possible that the security camera has been subject to tampering in step 542. In one embodiment, the camera system uses an accelerometer to determine whether the camera system may have been subjected to tampering. If there are indications of tampering, then a tamper alarm is sent in step 546 to the central control system 50.

On the other hand, if there are no indications of potential tampering, then a maintenance alarm is issued by the controller 110 to the central control system 50 in step 544.

While this invention has been particularly shown and described with references to preferred embodiments thereof, it will be understood by those skilled in the art that various changes in form and details may be made therein without departing from the scope of the invention encompassed by the appended claims.

What is claimed is:

1. A security camera system comprising:
a camera housing including a camera bubble;
a camera located within the camera bubble for generating images of a scene through the camera bubble;
a condensation mitigation system for removing condensation on the camera bubble of the security camera housing; and
a controller for analyzing the images of the scene for indications of misting on the camera bubble of the security camera housing by analyzing edges within the images for edge sharpness and then determining whether there is a degradation in the edge sharpness with reference to a reference frame and activating the condensation mitigation system in response to detecting the indications of misting.

2. The security camera system as claimed in claim 1, wherein the camera housing further includes a base portion for mounting the security camera system.

3. The security camera system as claimed in claim 1, further comprising a pan and tilt mechanism for directing the camera.

4. The security camera system as claimed in claim 1, wherein the condensation mitigation system comprises a heater for heating air within the camera bubble of the camera housing.

5. The security camera system as claimed in claim 1, wherein the condensation mitigation system comprises a fan or fans for moving air through the camera bubble of the camera housing.

6. The security camera system as claimed in claim 1, wherein the controller activates the condensation mitigation system in response to detecting the degradation of the edge sharpness in the images from the camera.

7. The security camera system as claimed in claim 6, wherein the controller continues to analyze the images for changes in the edge sharpness after the activation of the condensation mitigation system to determine whether the condensation has been remediated.

8. The security camera system as claimed in claim 6, wherein the controller deactivates the condensation mitigation system when the edge sharpness within the images has been reestablished.

9. The security camera system as claimed in claim 6, wherein the controller deactivates the condensation mitigation system after a predetermined time even when edge sharpness has not been reestablished.

10. A method of operation of a security camera system comprising a camera housing including a camera bubble, a camera located within the camera bubble for generating images of a scene through the camera bubble, and a condensation mitigation system for removing condensation on the camera bubble of the security camera housing, the method comprising:
analyzing the images of the scene for indications of misting on the camera bubble of the security camera housing by analyzing edges within the images for edge sharpness and then determining whether there is a degradation in the edge sharpness by reference to a reference frame; and
activating the condensation mitigation system in response to detecting the indications of misting.

11. The method as claimed in claim 10, wherein the condensation mitigation system comprises a heater for heating air within the camera bubble of the camera housing.

12. The method as claimed in claim 10, wherein the condensation mitigation system comprises a fan for moving air through the camera bubble of the camera housing.

13. The method as claimed in claim 10, further comprising activating the condensation mitigation system in response detecting the degradation in the edge sharpness in the images from the camera.

14. The method as claimed in claim 13, further comprising continuing to analyze the images for changes in the edge sharpness after the activation of the condensation mitigation system to determine whether the condensation has been remediated.

15. The method as claimed in claim 14, further comprising deactivating the condensation mitigation system when the edge sharpness within the images has been reestablished.

16. The method as claimed in claim 14, further comprising deactivating the condensation mitigation system after a predetermined time even when edge sharpness has not been reestablished.

17. The method as claimed in claim 10, further comprising determining whether or not a focus position has moved and capturing a new reference frame used to analyze the images of the scene for indications of misting.

18. The method as claimed in claim 10, further comprising determining whether or not an ambient temperature is acceptable for activation of the condensation mitigation system.

\* \* \* \* \*